(12) United States Patent
Park

(10) Patent No.: US 8,629,824 B2
(45) Date of Patent: Jan. 14, 2014

(54) LIQUID CRYSTAL DISPLAY DEVICE

(75) Inventor: Chang Keun Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 988 days.

(21) Appl. No.: 12/003,420

(22) Filed: Dec. 26, 2007

(65) Prior Publication Data

US 2008/0186421 A1 Aug. 7, 2008

(30) Foreign Application Priority Data

Feb. 1, 2007 (KR) ........................ 10-2007-0010487

(51) Int. Cl.
*G09G 3/36* (2006.01)
*G02F 1/141* (2006.01)

(52) U.S. Cl.
USPC .................................. 345/96; 345/87; 349/37

(58) Field of Classification Search
USPC .............................. 345/87–88, 95–96; 349/37
See application file for complete search history.

(56) References Cited

U.S. PATENT DOCUMENTS

| | | | | |
|---|---|---|---|---|
| 6,084,562 A * | 7/2000 | Onda | | 345/94 |
| 6,225,992 B1 * | 5/2001 | Hsu et al. | | 345/211 |
| 7,042,437 B2 * | 5/2006 | Tai et al. | | 345/103 |
| 2002/0018035 A1 * | 2/2002 | Song et al. | | 345/87 |
| 2002/0163490 A1 | 11/2002 | Nose | | |
| 2004/0032386 A1 * | 2/2004 | Pai | | 345/96 |
| 2005/0134538 A1 * | 6/2005 | Aoki | | 345/87 |
| 2005/0140619 A1 * | 6/2005 | Hong | | 345/87 |
| 2006/0012593 A1 * | 1/2006 | Iriguchi et al. | | 345/204 |
| 2007/0091044 A1 * | 4/2007 | Park et al. | | 345/88 |

FOREIGN PATENT DOCUMENTS

| | | | |
|---|---|---|---|
| KR | 2001-0001451 A | 1/2001 | |
| KR | 2002-0085844 A | 11/2002 | |
| KR | 2006-0086113 A | 7/2006 | |

OTHER PUBLICATIONS

Office Action dated Jun. 25, 2013, from the Korean Intellectual Property Office in counterpart Korean application No. 10-2007-0010487.

* cited by examiner

*Primary Examiner* — Jonathan Horner
(74) *Attorney, Agent, or Firm* — Morgan, Lewis & Bockius LLP

(57) ABSTRACT

A liquid crystal display device is disclosed, which can reduce a unit cost and prevent deterioration of picture quality caused by unfilled pixel cells, the liquid crystal display device comprising a liquid crystal panel including a plurality of pixel cells formed at every regions defined by 'n' gate lines and 'm' data lines, three colors alternatively arranged along the data line direction, and the same colors arranged along the gate line direction; a gate built-in circuit, built-in the liquid crystal panel, for supplying gate-on voltages to the gate lines; and a driving integrated circuit, formed in the liquid crystal panel, for driving the gate built-in circuit, inverting a polarity of video signal in the unit of each data line and at least three gate lines, and supplying the video signal having the inverted polarity to the data lines.

6 Claims, 7 Drawing Sheets

FIG. 4A

|     | DL1 | DL2 | DL3 | DL4 | DL5 | DL6 |
|-----|-----|-----|-----|-----|-----|-----|
| GL1 | +   | −   | +   | −   | +   | −   |
| GL2 | +   | −   | +   | −   | +   | −   |
| GL3 | +   | −   | +   | −   | +   | −   |
| GL4 | −   | +   | −   | +   | −   | +   |
| GL5 | −   | +   | −   | +   | −   | +   |
| GL6 | −   | +   | −   | +   | −   | +   |
| GL7 | +   | −   | +   | −   | +   | −   |
| GL8 | +   | −   | +   | −   | +   | −   |
| GL9 | +   | −   | +   | −   | +   | −   |

FIG. 4B

|     | DL1 | DL2 | DL3 | DL4 | DL5 | DL6 |
|-----|-----|-----|-----|-----|-----|-----|
| GL1 | −   | +   | −   | +   | −   | +   |
| GL2 | −   | +   | −   | +   | −   | +   |
| GL3 | −   | +   | −   | +   | −   | +   |
| GL4 | +   | −   | +   | −   | +   | −   |
| GL5 | +   | −   | +   | −   | +   | −   |
| GL6 | +   | −   | +   | −   | +   | −   |
| GL7 | −   | +   | −   | +   | −   | +   |
| GL8 | −   | +   | −   | +   | −   | +   |
| GL9 | −   | +   | −   | +   | −   | +   |

FIG. 5A

|     | DL1 | DL2 | DL3 | DL4 | DL5 | DL6 |
|-----|-----|-----|-----|-----|-----|-----|
| GL1 | +   | −   | +   | −   | +   | −   |
| GL2 | +   | −   | +   | −   | +   | −   |
| GL3 | +   | −   | +   | −   | +   | −   |
| GL4 | +   | −   | +   | −   | +   | −   |
| GL5 | −   | +   | −   | +   | −   | +   |
| GL6 | −   | +   | −   | +   | −   | +   |
| GL7 | −   | +   | −   | +   | −   | +   |
| GL8 | −   | +   | −   | +   | −   | +   |
| GL9 | +   | −   | +   | −   | +   | −   |

|     | DL1 | DL2 | DL3 | DL4 | DL5 | DL6 |
|-----|-----|-----|-----|-----|-----|-----|
| GL1 | −   | +   | −   | +   | −   | +   |
| GL2 | −   | +   | −   | +   | −   | +   |
| GL3 | −   | +   | −   | +   | −   | +   |
| GL4 | −   | +   | −   | +   | −   | +   |
| GL5 | +   | −   | +   | −   | +   | −   |
| GL6 | +   | −   | +   | −   | +   | −   |
| GL7 | +   | −   | +   | −   | +   | −   |
| GL8 | +   | −   | +   | −   | +   | −   |
| GL9 | −   | +   | −   | +   | −   | +   |

| | DL1 | DL2 | DL3 | DL4 | DL5 | DL6 | |
|---|---|---|---|---|---|---|---|
| GL1 | + | − | + | − | + | − | ... |
| GL2 | + | − | + | − | + | − | ... |
| GL3 | + | − | + | − | + | − | ... |
| ⋮ | ⋮ | ⋮ | ⋮ | ⋮ | ⋮ | ⋮ | |
| GLn/2−2 | + | − | + | − | + | − | ... |
| GLn/2−1 | + | − | + | − | + | − | ... |
| GLn/2 | + | − | + | − | + | − | ... |
| GLn/2+1 | − | + | − | + | − | + | ... |
| GLn/2+2 | − | + | − | + | − | + | ... |
| GLn/2+3 | − | + | − | + | − | + | ... |
| ⋮ | ⋮ | ⋮ | ⋮ | ⋮ | ⋮ | ⋮ | |
| GLn−2 | − | + | − | + | − | + | ... |
| GLn−1 | − | + | − | + | − | + | ... |
| GLn | − | + | − | + | − | + | ... |

FIG. 6B

| | DL1 | DL2 | DL3 | DL4 | DL5 | DL6 | |
|---|---|---|---|---|---|---|---|
| GL1 | − | + | − | + | − | + | ... |
| GL2 | − | + | − | + | − | + | ... |
| GL3 | − | + | − | + | − | + | ... |
| ⋮ | ⋮ | ⋮ | ⋮ | ⋮ | ⋮ | ⋮ | |
| GLn/2−2 | − | + | − | + | − | + | ... |
| GLn/2−1 | − | + | − | + | − | + | ... |
| GLn/2 | − | + | − | + | − | + | ... |
| GLn/2+1 | + | − | + | − | + | − | ... |
| GLn/2+2 | + | − | + | − | + | − | ... |
| GLn/2+3 | + | − | + | − | + | − | ... |
| ⋮ | ⋮ | ⋮ | ⋮ | ⋮ | ⋮ | ⋮ | |
| GLn−2 | + | − | + | − | + | − | ... |
| GLn−1 | + | − | + | − | + | − | ... |
| GLn | + | − | + | − | + | − | ... |

FIG. 7A

|       | DL1 | DL2 | DL3 | DL4 | DL5 | DL6 |     |
|-------|-----|-----|-----|-----|-----|-----|-----|
| GL1   | +   | −   | +   | −   | +   | −   | ... |
| GL2   | +   | −   | +   | −   | +   | −   | ... |
| GL3   | +   | −   | +   | −   | +   | −   | ... |
| GLn/2−2 | + | −   | +   | −   | +   | −   | ... |
| GLn/2−1 | + | −   | +   | −   | +   | −   | ... |
| GLn/2   | + | −   | +   | −   | +   | −   | ... |
| GLn/2+1 | + | −   | +   | −   | +   | −   | ... |
| GLn/2+2 | + | −   | +   | −   | +   | −   | ... |
| GLn/2+3 | + | −   | +   | −   | +   | −   | ... |
| GLn−2 | +   | −   | +   | −   | +   | −   | ... |
| GLn−1 | +   | −   | +   | −   | +   | −   | ... |
| GLn   | +   | −   | +   | −   | +   | −   | ... |

FIG. 7B

|       | DL1 | DL2 | DL3 | DL4 | DL5 | DL6 |     |
|-------|-----|-----|-----|-----|-----|-----|-----|
| GL1   | −   | +   | −   | +   | −   | +   | ... |
| GL2   | −   | +   | −   | +   | −   | +   | ... |
| GL3   | −   | +   | −   | +   | −   | +   | ... |
| GLn/2−2 | − | +   | −   | +   | −   | +   | ... |
| GLn/2−1 | − | +   | −   | +   | −   | +   | ... |
| GLn/2   | − | +   | −   | +   | −   | +   | ... |
| GLn/2+1 | − | +   | −   | +   | −   | +   | ... |
| GLn/2+2 | − | +   | −   | +   | −   | +   | ... |
| GLn/2+3 | − | +   | −   | +   | −   | +   | ... |
| GLn−2 | −   | +   | −   | +   | −   | +   | ... |
| GLn−1 | −   | +   | −   | +   | −   | +   | ... |
| GLn   | −   | +   | −   | +   | −   | +   | ... |

LIQUID CRYSTAL DISPLAY DEVICE

This application claims the benefit of Korean Patent Application No. 10-2007-0010487 filed Feb. 1, 2007 which is hereby incorporated by reference as if fully set forth herein.

BACKGROUND OF THE INVENTION

1. Field of the Invention

The present invention relates to a liquid crystal display (LCD) device, and more particularly, to a liquid crystal display device which can reduce a unit cost and prevent deterioration of picture quality caused by unfilled pixel cells.

2. Discussion of the Related Art

In general, a liquid crystal display device controls an optical transmission ratio of liquid crystal molecules by using an electric field applied thereto, to thereby display desired images. For this, the liquid crystal display device is provided with a liquid crystal panel having liquid crystals between two glass substrates, a plurality of liquid crystal cells arranged in a matrix configuration, and switching devices to respectively change signals supplied to the liquid crystal cells; a driving circuit for driving the liquid crystal panel; and a backlight unit for directing light onto the liquid crystal panel.

Recently, the number of signal lines or the number of circuit components included in the liquid crystal panel are decreased to realize thinness and rightness in the liquid crystal display device, as well as low fabrication cost in the liquid crystal display device. For example, Korean patent publication No. 10-2003-0039972 discloses a flexible printed circuit and a liquid crystal display device having no gate printed circuit board, which can reduce the panel size and the fabrication cost of the liquid crystal display device.

However, because a plurality of data and gate driver integrated circuits, and data printed circuit boards, and the like are provided, the flexible printed circuit and the liquid crystal display device having no gate printed circuit board have problems in that the reduction of the size and the production cost is limited, and power consumption is high.

SUMMARY OF THE INVENTION

Accordingly, the present invention is directed to a liquid crystal display device the same that substantially obviates one or more problems due to limitations and disadvantages of the related art.

An object of the present invention is to provide a liquid crystal display device which can reduce a unit cost and prevent deterioration of picture quality caused by unfilled pixel cells.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device comprises a liquid crystal panel including a plurality of pixel cells formed at every regions defined by 'n' gate lines and 'm' data lines, three colors alternatively arranged along the data line direction, and the same colors arranged along the gate line direction; a gate built-in circuit, built-in the liquid crystal panel, for supplying gate-on voltages to the gate lines; and a driving integrated circuit, formed in the liquid crystal panel, for driving the gate built-in circuit, inverting a polarity of video signal in the unit of each data line and at least three gate lines, and supplying the video signal having the inverted polarity to the data lines.

In another aspect, an LCD device comprises a liquid crystal panel including a plurality of pixel cells formed at every regions defined by 'n' gate lines and 'm' data lines; a gate built-in circuit, built-in the liquid crystal panel, for supplying gate-on voltages to the gate lines; and a driving integrated circuit, formed in the liquid crystal panel, for driving the gate built-in circuit, and supplying video signals corresponding to the different colors in the unit of horizontal line corresponding to the gate line direction, wherein the driving integrated circuit inverts the polarity of video signal in the unit of each data line and at least three gate lines.

At this time, the pixel cells include three colors alternately arranged along the data line direction, and the adjacent three pixel cells constitute one unit pixel.

The pixel cells include a pixel electrode that has a short side parallel to the data line formed shorter than a long side parallel to the gate line.

Also, the driving integrated circuit comprises a signal relay unit to relay input source data signals and synchronizing signals; a first power generating unit to generate a first power; a second power generating unit to generate a second power by using the first power; a common voltage generating unit to supply a common voltage to the liquid crystal panel by using the second power; a signal control unit to align the source data signal supplied from the signal relay unit to be suitable for the driving of the liquid crystal panel, and to control the inside of driving integrated circuit; a control signal generating unit to generate data control signals and gate driving signals to drive the gate integrated circuit by using the synchronizing signals supplied through the signal control unit; a voltage pull-up circuit to pull up voltage levels of the gate driving signal by using the second power, and to supply the gate driving signals having the voltage level pulled up to the gate built-in circuit; a gray scale generating unit to generate a plurality of gray scale voltages by using the first power; and a data converting unit to convert the aligned data signal supplied from the signal control unit to the video signal in response to the data control signal by using the plurality of gray scale voltages.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A and 4B are diagrams illustrating a polarity pattern of video signal displayed in a liquid crystal panel of a liquid crystal display device according to the first embodiment of the present invention;

FIGS. 5A and 5B are diagrams illustrating a polarity pattern of video signal displayed in a liquid crystal panel of a liquid crystal display device according to the second embodiment of the present invention;

FIGS. 6A and 6B are diagrams illustrating a polarity pattern of video signal displayed in a liquid crystal panel of a liquid crystal display device according to the third embodiment of the present invention; and FIGS. 7A and 7B are diagrams illustrating a polarity pattern of video signal displayed in a liquid crystal panel of a liquid crystal display device according to the fourth embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display device according to the preferred embodiment of the present invention will be described with reference to the accompanying drawings.

Figure 1:
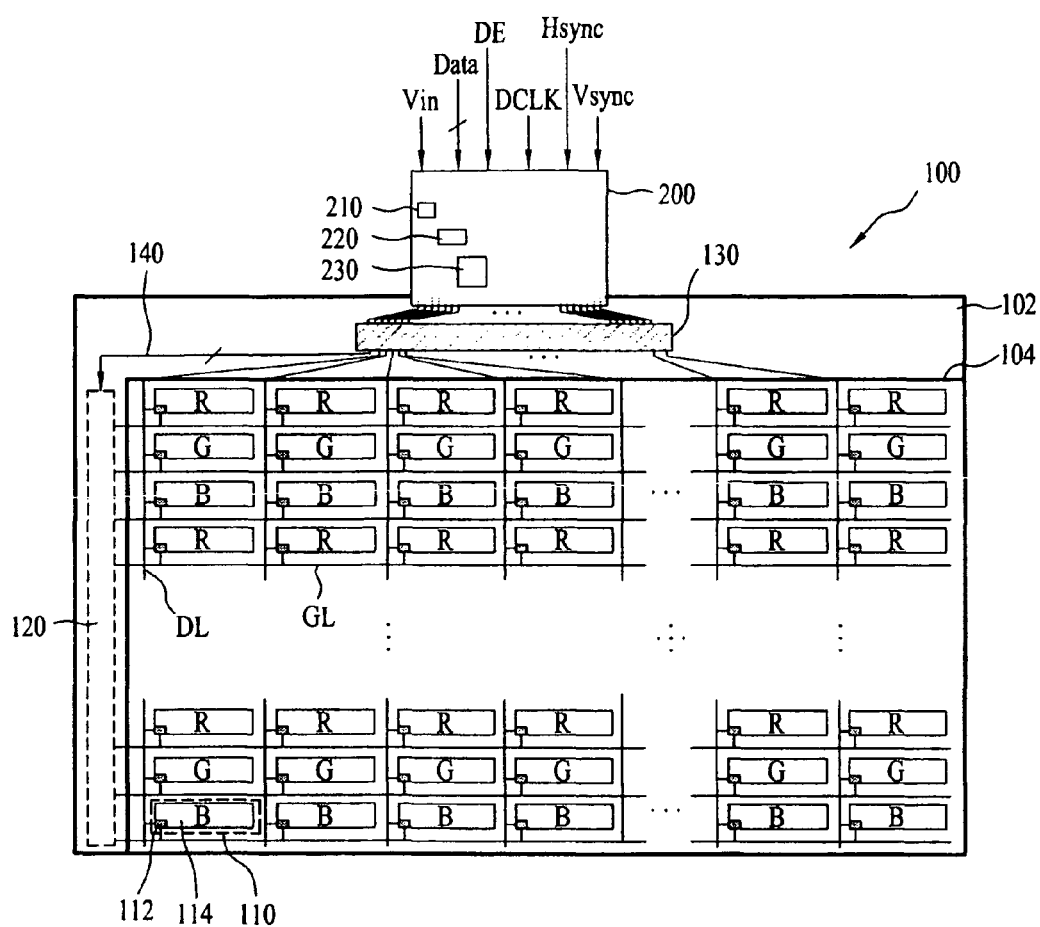
FIG. 1 is a schematic diagram illustrating a liquid crystal display device according to the preferred embodiment of the present invention.

FIG. 1 is a schematic diagram illustrating a liquid crystal display device according to the preferred embodiment of the present invention. As shown in FIG. 1, the liquid crystal display device according to the preferred embodiment of the present invention includes a liquid crystal panel 100 having a plurality of pixel cells 110 defined by the crossing of a plurality of data lines DL and gate lines GL; a gate built-in circuit 120 for driving the gate lines GL, wherein the gate built-in circuit 120 is built-in the liquid crystal panel 100; a driving integrated circuit 130 for driving the gate built-in circuit 120 and supplying video signals to the data lines DL, wherein the driving integrated circuit 130 is mounted on the liquid crystal panel 100; and a flexible printed circuit 200 attached to the liquid crystal panel 100 for connecting the liquid crystal panel 100 to an external driving system (not shown). At this time, the pixel cells 110 include three colors alternately arranged along the data line direction (vertical direction), while the pixels of the same color are arranged along the gate line direction (horizontal direction).

The liquid crystal panel 100 includes a lower substrate 102 and an upper substrate 104 bonded facing each other; spacers (not shown) for maintaining a constant cell gap between the lower and upper substrates 102 and 104; and a liquid crystal layer (not shown) filled in a liquid crystal space provided by the spacers.

The lower substrate 102 includes a display region that corresponds to the upper substrate 104 and a non-display region that excludes the display region. In the display region of the lower substrate 102, a plurality of data lines DL are formed at predetermined intervals parallel to each other along a first direction; a plurality of gate lines GL are formed at predetermined intervals parallel to each other along a second direction; and the pixel cells 110 are formed in the regions defined by the crossings of the plurality of data lines DL and gate lines GL. In this case, the first direction may be perpendicular to the second direction. The number of data lines DL supplied with the video signal is smaller than the number of gate lines GL supplied with gate-on voltages.

Each of the pixel cells 110 includes a thin film transistor 112 connected both to the gate line GL and the data line DL; and a pixel electrode 114 connected to the thin film transistor 112. Each thin film transistor 112 includes a gate electrode connected to the gate line GL; a source electrode connected to the data line DL; and a drain electrode connected to the pixel electrode 114. As each thin film transistor 112 is switched-on in response to the gate-on voltage supplied to the gate line GL, each thin film transistor 112 supplies the video signal output from the data line DL to the corresponding pixel electrode 114.

The pixel electrode 114 has a short side parallel to the data line DL and a long side parallel to the gate line GL, wherein the short side is shorter than the long side. Accordingly, the pixel electrodes 114 may form horizontal stripes.

In the non-display region of the lower substrate 102, the gate built-in circuit 120 is connected to each of the plurality of the gate lines GL; and the driving integrated circuit 130 formed therein.

The upper substrate 104 includes color filters, a common electrode and a light shielding layer. The common electrode may be formed on the lower substrate 102 depending on the operating mode of the liquid crystals of the liquid crystal layer. The color filters include a red R color filter, a green G color filter, and a blue B color filter. The color filters are arranged so that red R, green G, and blue B color filters are alternately arranged along the data line DL direction, while color filters of the same color are arranged along the gate line GL direction at each gate line.

The common electrode may be formed over the entire upper substrate 104 or in shape of lines opposite to the pixel electrode 114 for forming a vertical electric field across the liquid crystal layer. Alternatively, the common electrode may be formed on the lower substrate 102 as electrodes parallel to the pixel electrodes 114 for forming a horizontal electric field across the liquid crystal layer.

The light shielding layer is formed on the upper substrate 104 to overlap regions of the pixel regions excluding aperture regions overlapping the pixel electrodes 114. The red R, green G, and blue B pixel cells respectively on the red R color filter, the green G color filter, and the blue B color filter constitute one unit pixel for one color picture.

The flexible printed circuit 200 is provided in the non-display region of the lower substrate 102 and attached to a pad portion of the lower substrate 102. The flexible printed circuit 200 transmits a source data signal Data, and synchronizing signals DE, DCLK, Hsync, and Vsync from a driving system to the driving integrated circuit 130.

The driving integrated circuit 130 is formed in an integrated circuit forming portion having a plurality of input/output pads at the non-display region of the lower substrate 102. The driving integrated circuit 130 may include a plurality of input/output bumps to be electrically connected to the input/output pads at the integrated circuit forming portion, respectively.

In addition, the driving integrated circuit 130 generates a gate driving signal and a data control signal to divide one horizontal period corresponding to one period of the horizontal synchronizing signal Hsync into first to third sub-periods by using at least one of the synchronizing signals DE, DCLK, Hsync, and Vsync received from the flexible printed circuit 200.

The driving integrated circuit 130 aligns the source data signals Data in order of red R, green G and blue B data corresponding to the first to third sub-periods; converts the aligned data into video signals corresponding to analog signals; and supplies the video signals to the data lines DL. At this time, the polarity of video signal is inverted in the unit of data line and at least three gate lines, and is also inverted in the unit of frame.

Figure 2:
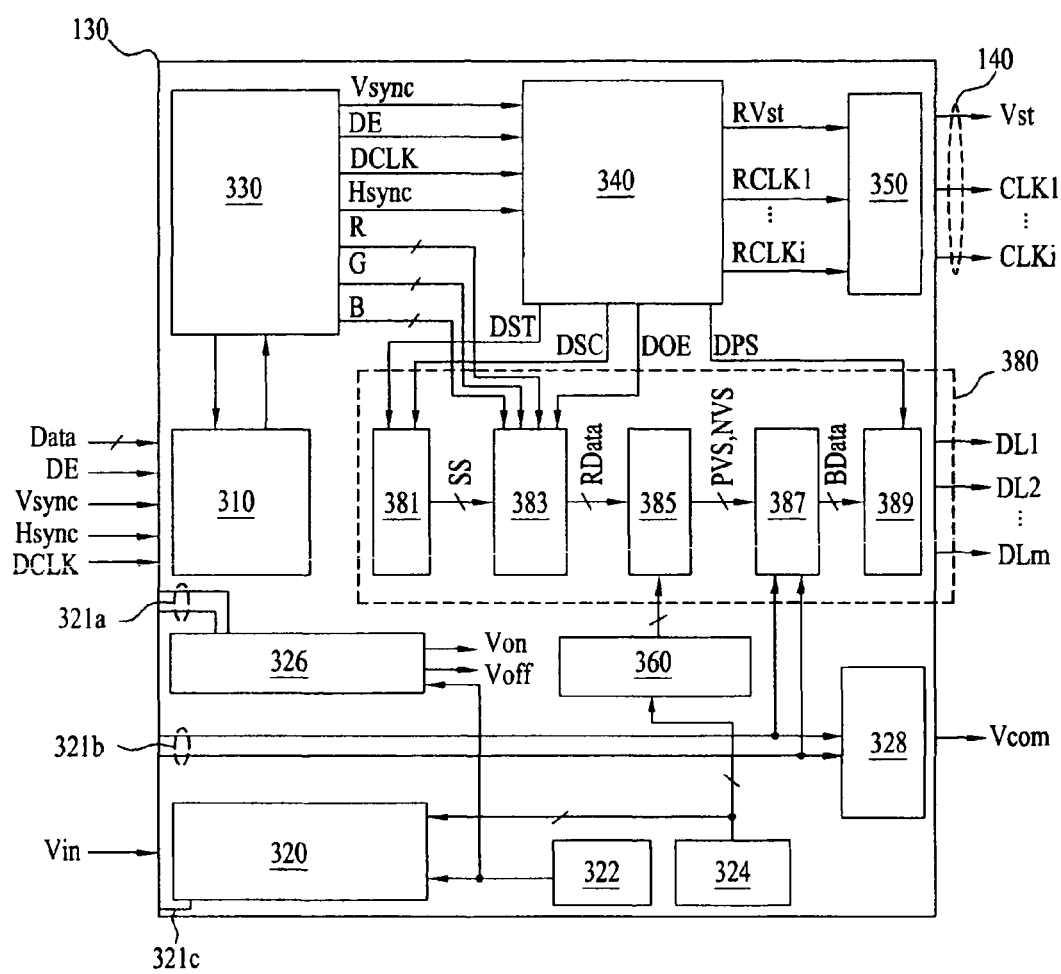
FIG. 2 is a block diagram illustrating a driving integrated circuit shown in FIG. 1.

For accomplishing the above described functions, as shown in FIG. 2, the driving integrated circuit 130 includes a signal relay unit 310, a first power generating unit 320, a clock generating unit 322, a reference voltage setting up unit 324, a second power generating unit 326, a common voltage generating unit 328, a signal control unit 330, a control signal generating unit 340, a voltage pull up circuit 350, a gray scale voltage generating unit 360, and a data converting unit 380.

The signal relay unit 310 relays the source data signal Data and the synchronizing signals DE, DCLK, Hsync, and Vsync from the flexible printed circuit 200 to the signal control unit 330.

The clock generating unit 322 generates clock signals for driving the first and second power generating units 320 and 326.

The first power generating unit 320 generates a first power, i.e., first and second reference voltages VSP and VSN by using an input power Vin from the flexible printed circuit 200 and using the clock signal from the clock generating unit 322. In addition, passive elements, such as a resistor 210, a capacitor 220 and an inductor 230 in the flexible printed circuit 200 are connected to the first power generating unit 320 through power signal lines 321a, 321b, and 321c, and used for biasing the first and second reference voltages VSP and VSN generated at the first power generating unit 320 or setting up option functions of the driving integrated circuit 130.

The second power generating unit 326 generates a second power, i.e., first and second driving voltages Vdd and Vss, an integrated circuit driving voltage Vcc, a gate-on voltage Von and a gate-off voltage Voff, required for driving the liquid crystal panel 100 by using the first and second reference voltages VSP and VSN generated at the first power generating unit 320.

The reference voltage setting up unit 324 sets up levels of the first and second reference voltages VSP and VSN to be supplied to the gray scale voltage generating unit 360 from the first power generating unit 320. The common voltage generating unit 328 generates a common voltage Vcom to be supplied to the common electrode of the liquid crystal panel 100 by using the first and second driving voltages Vdd and Vss supplied to the passive elements on the flexible printed circuit 200 from the second power generating unit 326. The flexible printed circuit 200 includes a common voltage varying unit (not shown) for varying the common voltage Vcom generated at the common voltage generating unit 328 by using at least one of capacitor and resistor (not shown).

The signal control unit 330 controls driving of the signal relay unit 310, and also controls the internal circuit block of driving integrated circuit 130.

The signal control unit 330 supplies the synchronizing signals DE, DCLK, Hsync, and Vsync from the signal relay unit 310 to the control signal generating unit 340.

The signal control unit 330 aligns the source data signal Data for one horizontal period from the signal relay unit 310 in order of the red R, green G and blue B data corresponding to the first to third sub-periods. Also, the signal control unit 330 supplies the red data R aligned during the first sub-period of one horizontal period to the data converting unit 380; supplies the green data G aligned during the second sub-period of one horizontal period to the data converting unit 380; and supplies the blue data B aligned during the third sub-period of one horizontal period to the data converting unit 380.

The control signal generating unit 340 generates data control signals DST, DSC, DOE, and DPS, and gate driving signals RVst, and RCLK1 to RCLKi by using at least one of the synchronizing signals DE, DCLK, Hsync, and Vsync from the signal control unit 330.

The data control signals DST, DSC, DOE, and DPS include a data start signal DST, a data shift clock DSC, a data output signal DOE, and a data polarity signal DPS for controlling the data converting unit 380. The control signal generating unit 340 generates the data polarity signal DPS that inverts the polarity of video signal in the unit of frame as well as in the unit of data line DL and at least three gate lines.

The gate driving signal RVst, and RCLK1 to RCLKi includes a gate start signal RVst and first to (i)th clock signals RCLK1 to RCLKi for driving the gate built-in circuit 120. The first to (i)th clock signals RCLK1 to RCLKi have phases delayed in sequence so that the first to (i)th clock signals RCLK1 to RCLKi are made to have pulse widths for turning on the thin film transistors in each of the sub-periods, respectively. The first to (i)th clock signals RCLK1 to RCLKi may have any one of two, four, six, eight, or ten depending on the design of the gate built-in circuit 120.

The voltage pull up circuit 350 pulls up voltage levels of the gate driving signals RVst, and RCLK1 to RCLKi supplied from the control signal generating unit 340 by using the gate-on voltage Von and the gate-off voltage Voff supplied from the second power generating unit 326. The gate-on voltage Von is a voltage for turning on the thin film transistor 112 of each pixel cell 110, and the gate-off voltage Voff is a voltage for turning off the thin film transistor 112 of each pixel cell 110. The voltage pull up circuit 350 supplies the gate driving signals Vst, and CLK1 to CLKi pulled up through a gate driving signal transmission line 140 at the non-display region of the lower substrate 102 to the gate built-in circuit 120.

The gray scale voltage generating unit 360 subdivides the first and second reference voltages VSP and VSN from the first power generating unit 320, to generate a plurality of gray scale voltages and to supply the plurality of gray scale voltages to the data converting unit 380. The plurality of gray scale voltages generate $2^N$ positive (+) polarity gray scale voltages and $2^N$ negative (−) polarity gray scale voltages, if the source data signal Data has N bits.

The data converting unit 380 includes a shift register 381, a latch unit 383, a digital-analog converting unit 385, a buffer unit 387, and a select unit 389.

The shift register 381 shifts the data start signal DST in sequence in response to the data shift clock DSC from the control signal generating unit 340, to generate a shift signal SS. At this time, the shift register 381 may be a bidirectional shift register that is driven in opposite directions in accordance with a directional signal from the signal control unit 330.

The latch unit 383 latches the data RGB of one sub-period from the signal control unit 330 in sequence in response to the shift signal SS from the shift register 381. In addition, the latch unit 383 supplies the latched data Rdata of one sub-period to the digital-analog converting unit 385 in response to the data output signal DOE from the control signal generating unit 340.

The digital-analog converting unit 385 converts the latched data RData supplied from the latch unit 383 into positive polarity and negative polarity video signals PVS and NVS corresponding to analog signals by using the plurality of positive polarity gray scale voltages and negative polarity gray scale voltages from the gray scale voltage generating unit 360. The digital-analog converting unit 385 selects one gray scale voltage corresponding to a gray scale value of the latched data RData from the plurality of positive polarity gray scale voltages as the positive polarity video signal PVS, and one gray scale voltage corresponding to a gray scale value of the latched data RData from the plurality of negative polarity gray scale voltages as the negative polarity video signal NVS.

The buffer unit 387 buffers the positive polarity and negative polarity video signals PVS and NVS by using first and second driving voltages Vdd and Vss through the passive elements of the flexible printed circuit 200 from the first power generating unit 320. For example, the buffer unit 387 amplifies the positive polarity and negative polarity video signals PVS and NVS to a level suitable for driving a load on the data lines DL.

The select unit 389 selects the positive polarity or negative polarity video signal PVS or NVS supplied from the buffer unit 387 in response to the data polarity signal DPS from the control signal generating unit 340, and supplies the selected video signal to the data lines DL through respective output channels. That is, the polarity of video signal selected and output by the select unit 389 is inverted based on the data polarity signal DPS.

Referring to FIG. 1, the gate built-in circuit 120 is formed at the non-display region of the lower substrate 102 concurrently with a process for forming the thin film transistors 112 and the gate built-in circuit 120 is connected to the plurality of gate lines GL. The gate built-in circuit 120 generates the gate-on voltage Von at every sub-period in response to pulled up gate driving signals Vst, and CLK1 to CLKi supplied from the driving integrated circuit 130, and supplies the gate-on voltage Von to the gate lines GL in sequence. For example, the driving integrated circuit 130 supplies the pulled up gate driving signals Vst, and CLK1 to CLKi to the gate built-in circuit 120 through the plurality of gate driving signal transmission lines 140 formed at the non-display region of the lower substrate 102.

Figure 3:
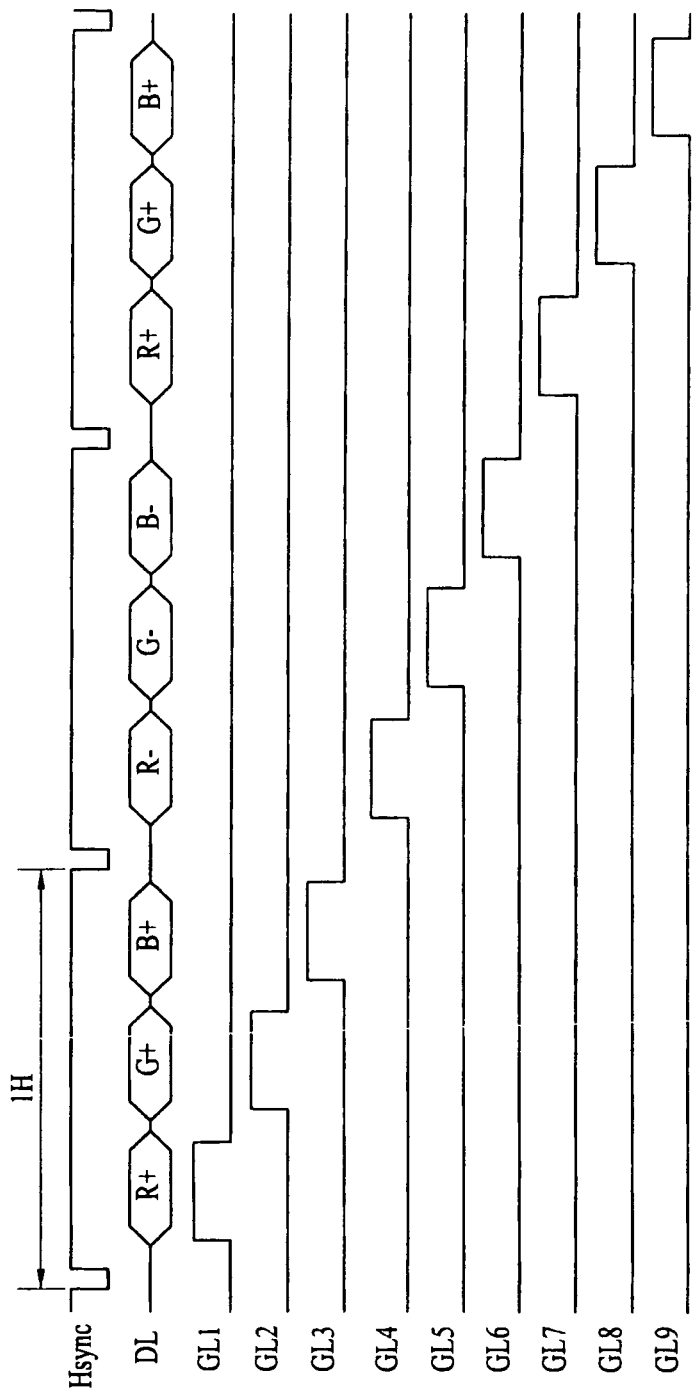
FIG. 3 is a waveform diagram illustrating a driving method of a liquid crystal display device according to the preferred embodiment of the present invention.

FIG. 3 is a waveform diagram illustrating a driving method of a liquid crystal display device according to the preferred embodiment of the present invention.

A method for driving a liquid crystal display device according to the preferred embodiment of the present invention will be explained with reference to FIG. 3 in association with FIG. 1.

During the first sub-period of the first horizontal period, and in synchronization with the supply of the gate-on voltage to the first gate line GL1, the positive (+) polarity red video signal R+ is supplied to the respective data lines DL. Thus, the pixel cells 110 of the first horizontal line display red video corresponding to the positive polarity red video signal R+.

During the second sub-period of the first horizontal period, and in synchronization with the supply of the gate-on voltage to the second gate line GL2, the positive (+) polarity green video signal G+ is supplied to the respective data lines DL. Thus, the pixel cells 110 of the second horizontal line display green video corresponding to the positive polarity green video signal G+.

During the third sub-period of the first horizontal period, and in synchronization with the supply of the gate-on voltage to the third gate line GL3, the positive (+) polarity blue video signal B+ is supplied to the respective data lines DL. Thus, the pixel cells 110 of the third horizontal line display blue video corresponding to the positive polarity blue video signal B+.

As a result, during the first horizontal period divided into the first to third sub-periods, one color picture is displayed by mixing the red, green and blue videos corresponding to the respective sub-periods in sequence.

During the first sub-period of the second horizontal period, and in synchronization with the supply of the gate-on voltage to the fourth gate line GL4, the negative (−) polarity red video signal R− is supplied to the respective data lines DL. Thus, the pixel cells 110 of the fourth horizontal line display red video corresponding to the negative polarity red video signal R−.

During the second sub-period of the second horizontal period, and in synchronization with the supply of the gate-on voltage to the fifth gate line GL5, the negative (−) polarity green video signal G− is supplied to the respective data lines DL. Thus, the pixel cells 110 of the fifth horizontal line display green video corresponding to the negative polarity green video signal G−.

During the third sub-period of the second horizontal period, and in synchronization with the supply of the gate-on voltage to the sixth gate line GL6, the negative (−) polarity blue video signal B− is supplied to the respective data lines DL. Thus, the pixel cells 110 of the sixth horizontal line display blue video corresponding to the negative polarity blue video signal B−.

As a result, during the second horizontal period divided into the first to third sub-periods, one color picture is displayed by mixing the red, green and blue videos corresponding to the respective sub-periods in sequence.

After the second horizontal period, the pixel cells of each horizontal period display color video according to the same method as those of the first and second horizontal periods. Also, the polarity pattern of the video signal supplied to the liquid crystal panel 100 is inverted in the unit of frame.

During the 'N'th frame, the polarity pattern of video signals supplied to the respective pixel cells 110 of the liquid crystal panel 100 is inverted in the unit of each data line and in the unit of three gate lines, as shown in FIG. 4A. Since the data polarity signal DPS is inverted in the 'N+1'th frame, the polarity pattern of video signal supplied to the respective pixel cells 110 of the liquid crystal panel 100 during the 'N+1'th frame is reverse to that during the 'N'th frame, as shown in FIG. 4B.

In the liquid crystal display device according to the first embodiment of the present invention, the liquid crystal panel 100 is driven by one driving integrated circuit that is built in the liquid crystal panel 100, so that it is possible to reduce the unit cost and to minimize the thickness of the liquid crystal display device. In addition, the polarity of video signal may be inverted in the unit of data line and three gate lines, thereby improving the picture quality by ensuring the sufficient time for charging the video signal with the minimized polarity change of video signal.

FIGS. 5A and 5B are diagrams illustrating a polarity pattern of video signal displayed in a liquid crystal panel of a liquid crystal display device according to the second embodiment of the present invention.

As shown in FIGS. 5A and 5B in association with FIG. 1, except for the polarity pattern of video signal displayed on the liquid crystal display panel, the liquid crystal display device according to the second embodiment of the present invention is identical to that according to the first embodiment of the present invention. Accordingly, a detailed understanding of the identical structural elements may be appreciated from the above description associated with FIGS. 1 to 4. In the liquid crystal display device according to the second embodiment of the present invention, a driving integrated circuit 130 inverts the polarity of video signal in the unit of each data line DL and in the unit of four gate lines GL; and supplies the video signal having the inverted polarity to the data lines DL. Accordingly, the liquid crystal display device according to the second embodiment of the present invention can improve the picture quality by ensuring the sufficient time for charging the video signal with the minimized polarity change of video signal.

FIGS. 6A and 6B are diagrams illustrating a polarity pattern of video signal displayed in a liquid crystal panel of a liquid crystal display device according to the third embodiment of the present invention.

As shown in FIGS. 6A and 6B in association with FIG. 1, except for the polarity pattern of video signal displayed on the liquid crystal display panel, the liquid crystal display device according to the third embodiment of the present invention is identical to that according to the first embodiment of the present invention. Accordingly, a detailed understanding of the identical structural elements may be appreciated from the above description associated with FIGS. 1 to 4. In the liquid crystal display device according to the third embodiment of the present invention, on assumption that there are 'n' gate lines, a driving integrated circuit 130 inverts the polarity of video signal in the unit of each data line DL and in the unit of 'n/2' gate lines; and supplies the video signal having the inverted polarity to the data lines DL. Accordingly, the liquid crystal display device according to the third embodiment of the present invention can improve the picture quality by ensuring the sufficient time for charging the video signal with the minimized polarity change of video signal.

FIGS. 7A and 7B are diagrams illustrating a polarity pattern of video signal displayed in a liquid crystal panel of a liquid crystal display device according to the fourth embodiment of the present invention.

As shown in FIGS. 7A and 7B in association with FIG. 1, except for the polarity pattern of video signal displayed on the liquid crystal display panel, the liquid crystal display device according to the fourth embodiment of the present invention is identical to that according to the first embodiment of the present invention. Accordingly, a detailed understanding of the identical structural elements may be appreciated from the above description associated with FIGS. 1 to 4. In the liquid crystal display device according to the fourth embodiment of the present invention, a driving integrated circuit 130 inverts the polarity of video signal in the unit of each data line DL and in the unit of each frame; and supplies the video signal having the inverted polarity to the data lines DL. Accordingly, the liquid crystal display device according to the fourth embodiment of the present invention can improve the picture quality by ensuring the sufficient time for charging the video signal with the minimized polarity change of video signal.

In the liquid crystal display device according to the present invention, the liquid crystal panel is driven by one driving integrated circuit that is built in the liquid crystal panel, wherein the polarity of video signal is inverted in the unit of each data line and at least three gate lines by using the driving integrated circuit, so that it is possible to reduce the unit cost and to prevent the deterioration of picture quality caused by unfilled pixel cells.

As mentioned above, the liquid crystal display device according to the preferred embodiments of the present invention has the following advantages.

First, the liquid crystal panel is driven by one driving integrated circuit that is built in the liquid crystal panel, so that it is possible to reduce the unit cost and to minimize the thickness of the liquid crystal display device.

In addition, the polarity of video signal is inverted in the unit of data line and at least three gate lines, so that it is possible to reduce the power consumption and to improve the picture quality by ensuring the charging time of pixel cell.

The arrangement of the pixel cells of a single color along the horizontal direction permits a reduction in number of data lines by a third (⅓).

Accordingly as the liquid crystal panel is driven by one driving integrated circuit, the flexible printed circuit is minimized in size, allowing the unit cost of flexible printed circuit to be reduced.

As the gate driver to drive the gate lines is built in the liquid crystal panel, it is possible to eliminate a gate driver integrated circuit, a gate flexible printed circuit, and a gate printed circuit board.

Moreover, by manufacturing of the liquid crystal display device using a liquid crystal panel fabrication process, a driving integrated circuit mounting process, and a flexible printed circuit attachment process utilize a simplified manufacturing process to thereby minimizing a defect ratio.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device, comprising:
a liquid crystal panel including a plurality of pixel cells formed at every regions defined by 'n' gate lines and 'm' data lines, three colors alternatively arranged along the data line direction, and the same colors arranged along the gate line direction;
a gate built-in circuit, built-in the liquid crystal panel, configured to drive the gate lines;
a single driving integrated circuit, formed in the liquid crystal panel, configured to:
    drive the gate built-in circuit,
    invert a polarity of video signal in the unit of each data line and at least three gate lines, and
    supply the video signal having the inverted polarity to the data lines, where polarities of the plurality of pixel cells in Nth frame are reverse to polarities of the plurality of pixel cells in N+1th frame and the polarities of the plurality of pixel cells are inverted every three color pixel cells according to a direction of the gate line as well as the direction of the data line, where the three color pixel cells always have the same polarity and are respectively connected to three gate lines, driven during one horizontal period, and are connected to one data line in common; and
a flexible printed circuit configured to connect the liquid crystal panel to an external driving system,
wherein the single driving integrated circuit comprises:
    a signal relay unit configured to relay input source data signals and synchronizing signals,
    a first power generating unit configured to generate a first power voltage including first and second reference driving voltage signals using an input voltage and a clock signal,
    a second power generating unit configured to generate a second power voltage by using the first power including the first and second reference driving voltages and the clock signal,
    a clock generating unit configured to generate the clock signal for driving the first and second power generating units,
    a common voltage generating unit configured to supply a common voltage to the liquid crystal panel by using the second power,
    a signal control unit configured to:

align the source data signal supplied from the signal relay unit to be suitable for the driving of the liquid crystal panel; and control the inside of the driving integrated circuit, a control signal generating unit configured to generate data control signals and gate driving signals to drive the gate integrated circuit by using the synchronizing signals supplied through the signal control unit, a voltage pull-up circuit configured to:
pull up voltage levels of the gate driving signal by using the second power; and
supply the gate driving signals having the voltage level pulled up to the gate built-in circuit, a gray scale generating unit configured to:
receive the first power; and
generate a plurality of gray scale voltages by using the received first power, a data converting unit configured to convert the aligned data signal supplied from the signal control unit to the video signal in response to the data control signal by using the plurality of gray scale voltages, and a voltage-level setting up unit configured to set up levels of the first power supplied from the first power generating unit to the gray scale voltage generating unit, wherein the flexible printed circuit includes passive elements comprising at least one of: a resistor, a capacitor, and an inductor, the passive elements being configured to:
bias the first power generated from the first power generating unit, or
set up option functions of the single driving integrated circuit, and wherein the common voltage generating unit is further configured to generate the common voltage by using the second power supplied through the passive elements, which is positioned in the outer the single driving integrated circuit on the flexible printed circuit, from the second power generating unit.

2. The LCD device of claim 1, wherein the pixel cells include a pixel electrode comprising a short side parallel to the data line formed shorter than a long side parallel to the gate line.

3. The LCD device of claim 1, wherein the signal control unit is further configured to:
subdivide the one horizontal period into first to third sub-periods; and
align source data signal in order of first to third color data corresponding to the respective sub-periods.

4. The LCD device of claim 3, wherein the data converting unit comprises:
a shift register configured to generate a shift signal;
a latch unit configured to latch the aligned data according to the shift signal;
a digital-analog converting unit configured to convert the latched data to positive and negative polarity video signals by using the plurality of gray scale voltages;
a buffer unit configured to buffer the positive and negative polarity video signals; and
a select unit configured to select the positive polarity or the negative polarity video signal according to a data polarity signal from the control signal generating unit, and to supply the selected video signal to the data lines through respective output channels.

5. The LCD device of claim 4, wherein the control signal generating unit is further configured to generate the data polarity signal that inverts the polarity of video signal selected and output by the select unit in the unit of each data line and at least three gate lines.

6. The LCD device of claim 1, wherein the flexible printed circuit includes a common voltage varying unit comprising at least one of a resistor and a capacitor, the common voltage varying unit being configured to vary the common voltage.

* * * * *